(12) United States Patent
Sharon et al.

(10) Patent No.: US 10,376,960 B2
(45) Date of Patent: Aug. 13, 2019

(54) GRAIN SIZE CONTROL IN LASER BASED ADDITIVE MANUFACTURING OF METALLIC ARTICLES

(71) Applicant: United Technologies Corporation, Farminton, CT (US)

(72) Inventors: John A. Sharon, West Hartford, CT (US); Daniel V. Viens, Mansfield Center, CT (US); Tahany Ibrahim El-Wardany, Bloomfield, CT (US); Gajawalli V. Srinivasan, South Windsor, CT (US); Joseph J. Sangiovanni, West Suffield, CT (US); Ranadip Acharya, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 318 days.

(21) Appl. No.: 15/409,483

(22) Filed: Jan. 18, 2017

(65) Prior Publication Data

US 2018/0200798 A1    Jul. 19, 2018

(51) Int. Cl.
*B22F 5/00* (2006.01)
*B33Y 10/00* (2015.01)
(Continued)

(52) U.S. Cl.
CPC ............ *B22F 5/009* (2013.01); *B22F 3/1055* (2013.01); *B22F 7/06* (2013.01); *B23K 26/0006* (2013.01);
(Continued)

(58) Field of Classification Search
CPC .......... B22F 5/009; B22F 3/1055; B22F 7/06; B22F 2998/10; B33Y 10/00; B33Y 80/00;
(Continued)

(56) References Cited

U.S. PATENT DOCUMENTS 5,021,084 A * 6/1991 Bianchi ............... C23C 14/0005
                                                           118/726
5,161,950 A   11/1992 Krueger et al.
(Continued)

FOREIGN PATENT DOCUMENTS

DE    102013222865 A1   5/2015
EP      2586548 A1      5/2013
(Continued)

OTHER PUBLICATIONS

Partial European Search Report for EP Application No. 18151790.5, dated Jul. 13, 2018, 17 pages.
(Continued)

*Primary Examiner* — Mahmoud Gimie
(74) *Attorney, Agent, or Firm* — Kinney & Lange, P.A.

(57) ABSTRACT

An additively manufactured alloy component has a first portion formed of the alloy and having a first grain size, and a second portion formed of the alloy and having a second grain size smaller than the first grain size. In an embodiment, the alloy component is an alloy turbine disk, the first portion is a rim region of the alloy turbine disk, and the second portion is a hub region of the alloy turbine disk. The first and second grain sizes may be achieved by controllably varying the laser power and/or scan speed during additive manufacturing.

20 Claims, 1 Drawing Sheet

(51) Int. Cl.
*B33Y 80/00* (2015.01)
*B22F 3/105* (2006.01)
*B23K 26/342* (2014.01)
*F01D 5/02* (2006.01)
*B22F 7/06* (2006.01)
*B23K 26/00* (2014.01)
*B23K 26/082* (2014.01)
*B23K 101/00* (2006.01)
*B23K 103/18* (2006.01)

(52) U.S. Cl.
CPC .......... *B23K 26/082* (2015.10); *B23K 26/342* (2015.10); *B33Y 10/00* (2014.12); *B33Y 80/00* (2014.12); *F01D 5/02* (2013.01); *B22F 2301/00* (2013.01); *B22F 2998/10* (2013.01); *B23K 2101/001* (2018.08); *B23K 2103/26* (2018.08); *F05D 2300/171* (2013.01); *F05D 2300/174* (2013.01); *F05D 2300/609* (2013.01); *Y02P 10/295* (2015.11)

(58) Field of Classification Search
CPC .......... B23K 26/082; B23K 26/342; B23K 26/0006; B23K 2103/26; B23K 2101/001; F01D 5/02; F05D 2300/171; F05D 2300/174; F05D 2300/609
USPC ...................................... 416/24 R
See application file for complete search history.

(56) References Cited

U.S. PATENT DOCUMENTS

| | | |
|---|---|---|
| 5,312,497 A | 5/1994 | Mathey |
| 6,551,372 B1 * | 4/2003 | Ewing .................. C22C 1/0433 419/28 |
| 6,969,238 B2 | 11/2005 | Groh et al. |
| 7,967,924 B2 | 6/2011 | Groh et al. |
| 8,679,269 B2 | 3/2014 | Goller et al. |
| 2012/0282106 A1 * | 11/2012 | Goller ...................... B21J 1/06 416/244 R |
| 2013/0108460 A1 * | 5/2013 | Szwedowicz ......... B22F 3/1055 416/241 R |
| 2013/0156586 A1 | 6/2013 | Richter |
| 2015/0093279 A1 * | 4/2015 | Kington ................ B22F 3/1055 419/19 |
| 2015/0224607 A1 * | 8/2015 | Bruck .................. B23K 26/342 219/73.21 |
| 2015/0266285 A1 | 9/2015 | James et al. |
| 2015/0284832 A1 | 10/2015 | Goller et al. |
| 2016/0010469 A1 | 1/2016 | Guo |
| 2016/0031186 A1 * | 2/2016 | Mourer .................. C23C 10/28 428/656 |
| 2016/0114425 A1 | 4/2016 | Liu |
| 2016/0151860 A1 | 6/2016 | Engeli et al. |
| 2016/0175929 A1 * | 6/2016 | Colin ................ C04B 35/62839 419/23 |
| 2016/0348216 A1 * | 12/2016 | Szuromi ................ C22F 1/10 |

FOREIGN PATENT DOCUMENTS

| | | |
|---|---|---|
| EP | 2754515 A2 | 7/2014 |
| EP | 2772329 A1 | 9/2014 |
| EP | 2783789 A1 | 10/2014 |
| EP | 3088105 A1 | 11/2016 |
| WO | WO2015/009448 A1 | 1/2015 |
| WO | WO2016/023961 A1 | 2/2016 |

OTHER PUBLICATIONS

Extended European Search Report for EP Application No. 18207763.6, dated Feb. 21, 2019, 12 pages.

* cited by examiner

GRAIN SIZE CONTROL IN LASER BASED ADDITIVE MANUFACTURING OF METALLIC ARTICLES

BACKGROUND

This invention relates generally to the field of additive manufacturing. In particular the invention relates to turbine components with bimodal radial grain size distributions.

In gas turbine engines, disks which support turbine blades rotate at high speeds in a high temperature environment. In modern engines, operating temperatures can exceed 1500° F. (816° C.) in the exterior or rim portion of disks, and about 1000° F. (538° C.) at the inner or hub portions. In addition to this radial temperature gradient, there is also a stress gradient, with higher stresses occurring in the lower temperature hub region, while lower stresses occur in the higher temperature rim region in a typical disk. These differences in operating conditions radially across a disk result in different mechanical property requirements in the different disk regions, with the rim portion subjected to severe creep and hold time fatigue crack growth conditions, and the hub portion subjected to severe fatigue and high stress conditions. In order to achieve the maximum operating conditions in terms of efficiency and performance in an advanced turbine engine, it is desirable to utilize disk alloys having excellent hold time fatigue crack growth resistance and high temperature creep resistance in the rim portion while having high tensile strength and fatigue crack resistance at moderate temperatures in the hub portion.

SUMMARY

An additively manufactured alloy component has a first portion formed of the alloy and having a first grain size, and a second portion formed of the alloy and having a second grain size smaller than the first grain size.

In an embodiment, a method of additively manufacturing an alloy turbine disk having a first rim portion with a first grain size and a second hub portion with a second grain size smaller than the first grain size includes forming a layer of alloy powder on a build platform and forming a first fused rim region of the layer of alloy powder with the first grain size by scanning the first fused rim region with a laser at a first laser power at a first scan speed. The method further includes forming a second fused hub region of the layer of alloy powder with the second grain size by scanning the second fused hub region with the laser at a second laser power and a second scan speed wherein the second laser power is lower than the first laser power and/or the second scan speed is faster than the first scan speed. The method continues by repeating the process in a layer-by-layer fashion until the alloy turbine disk is formed.

DETAILED DESCRIPTION

The grain size of turbine alloys is known to affect their mechanical properties. In general, large grains result in improved creep life while smaller grains enable increases in fatigue resistance and strength. The relation between grain size and strength is given by the well-known Hall-Petch relation where strength is inversely proportional to the square root of the grain size. Local grain size manipulation in metal workpieces can be accomplished by combinations of mechanical processing and heat treatment, most notably deformation processing followed by recovery and recrystallization anneals.

Grain size control is often not a consideration for parts fabricated by laser based additive manufacturing techniques such as powder bed techniques or direct metal deposition techniques. Typically a single laser power and scan speed is used for an additive build. While the final grain size of a component is a function of the laser parameters, and post processing includes stress relief, hot isostatic pressing, solution and/or aging treatments and others, laser parameters are often neglected in conjunction with grain size. The present disclosure involves controlling energy density in laser based additive manufacturing to influence grain size in additively manufactured metallic components such as a turbine disk.

The core concept is that lower energy density (lower laser power and/or faster scan speed) during additive manufacturing results in an as-deposited microstructure with a finer grain size. Conversely, components using higher energy density during additive manufacturing (higher laser power and/or slower scan speed) results in an as-deposited microstructure with larger grain sizes. Grain size variations in a microstructure can be controllably varied by selecting proper deposition parameters as well as post-processing parameters. In the present disclosure, the concept is applied to tailoring microstructures at the rim and hub regions of additively manufactured high temperature turbine alloy disks.

Figure 1:
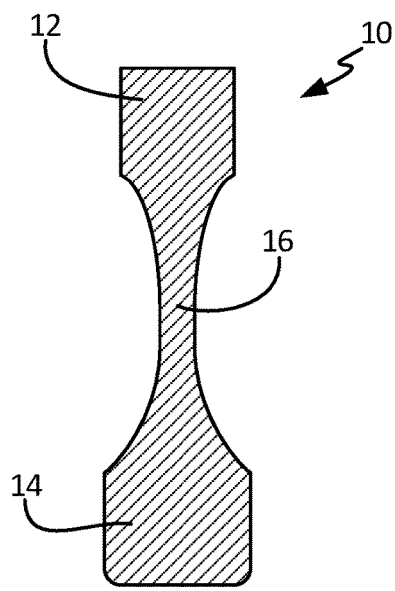
FIG. 1 is schematic cross-section of a turbine disk.

A schematic cross-section of a turbine disk is shown in FIG. 1. Turbine disk 10 comprises rim 12, hub 14, and web 16. In an embodiment, hub 14 may have an enhanced thickness to counter the fatigue loading in that region of the disk during operation. As noted earlier, the rim sections have microstructures with large grain sizes or, in an embodiment, single crystal microstructures to counter a high temperature creep operating environment of about 1500° F. (815° C.) or higher. The hub microstructures have fine grains to counter a low cycle fatigue environment at moderate temperatures of about 1000° F. (538° C.).

Example additive manufacturing processes suitable for turbine disk manufacturing include powder based layer by layer processes such as selective layer melting and laser powder bed fusion. Other example additive manufacturing processes suitable for turbine disk manufacturing include direct metal deposition and laser engineered net shaping. Laser powder bed fusion was chosen to illustrate the results discussed in the present disclosure.

The present disclosure relates to high temperature alloy turbine components in general and is not limited to turbine disks. Other example components include integrally bladed rotors and disks (blisks), and other high temperature rotating components.

Figure 2:
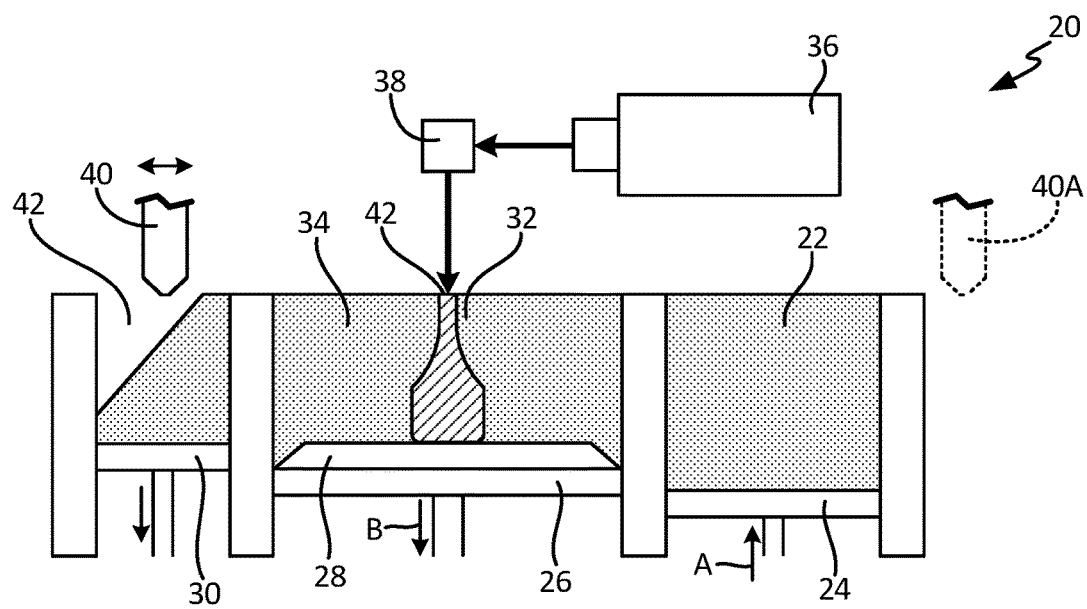
FIG. 2 is schematic representation of a laser powder bed fusion additive manufacturing process formed according to an embodiment of the present disclosure.

A schematic diagram of laser powder bed fusion (LPBF) process system 20 is shown in FIG. 2. LPBF process system 20 includes powder storage chamber 22, dispenser platform 24, build platform 26, and building plate 28 on build platform 26 in powder chamber 34. LPBF process 20 also includes laser 36, scanner 38, control systems and other equipment (not shown) to produce components by laser powder bed fusion in a controlled environment according to 3D computer models stored in memory in the device. During operation of LPBF process system 20, powder in storage chamber 22 is fed upward by dispenser platform 24 as indicated by arrow A and is spread over building plate 28 by spreader 40 shown in starting position 40A in phantom outline before traversing to a position over collection chamber 42 where excess powder is deposited on collection platform 30. Laser 36 and scanner 38 are activated to direct a laser beam over building plate 28 to fuse selected areas of powder 22 to form a single layer 42 of part 32 and to attach the fused areas of layer 42 to underlying fused areas of part 32 according to the 3D computer model stored in the memory in the device. In the next step, spreader 40 is returned to starting position 40A, dispenser platform 24 indexes up one layer of powder thickness, build platform 26 indexes downward one layer as indicated by arrow B, and the process is repeated until part 32 is completed. LPBF process system 20 is an example of an additive manufacturing system and is not meant to limit the invention to any single process known in the art.

Part 32, in an embodiment, is a turbine disk formed by laser based powder bed fusion. The disk has a bimodal grain size distribution in the rim 12 and hub 14 areas to withstand the operating conditions in a gas turbine engine. In an embodiment, grain sizes required for successful operation of a superalloy disk under normal operating conditions may be about 40 microns or larger in the region of rim 12 to exhibit the required high temperature creep resistance in that region of the disk. In an embodiment, the rim region may be a single crystal (essentially having infinite grain size due to a lack of grain boundaries). In an embodiment, grain sizes in hub 14 may be small to impart the high strength necessary to exhibit the required high fatigue resistance needed in that region of the disk. In the turbine disks fabricated by additive manufacturing in the present disclosure, these issues are addressed by intentionally manipulating the processing conditions during a build to influence the grain size. In particular, the laser power and/or scan speed, combined with post-deposition heat treatments, can result in desired large and small grain sizes in the rim and hub regions respectively of an additively built turbine disk component. The core concept of the disclosure is that lower energy density during fusion results in an as-fused microstructure that is finer compared to additive builds fused at high energy densities. In both cases, energy density is based on laser power and scan speed, wherein lower laser power and/or faster scan speed results in a lower energy density build and vice versa. During a build, regions of a constant grain size may be formed at a particular energy density, and the energy density may be changed to a different level to build an adjacent region with a different grain size. The grain size in the region between the two grain size regions may vary continuously from one region to another region or the grain size may change in an abrupt manner.

In various embodiments, the additively manufactured components may be made of nickel based alloys, cobalt based alloys, iron based alloys, mixtures of these alloys, or titanium alloys, for example.

In various embodiments, the region of the additively manufactured component that has a larger grain size may have a grain size that is greater than about 40 microns.

In various embodiments, the region of the additively manufactured component that has a smaller grain size may have a grain size that is between about 10 nanometers and about 30 microns.

In an embodiment, the rim region may be from about 10 percent to about 25 percent of the total area of the disk. In another embodiment, the hub region may be from about 50 percent to about 80 percent of the total area of the disk.

In an embodiment, a hybrid disk may be formed wherein outer rim region 12 with a large grain microstructure is formed by additive manufacturing and inner hub region 14 with a fine grain microstructure is formed by deformation processing and the two regions assembled during the additive manufacturing process.

In an embodiment, a hybrid disk may be formed wherein outer rim region 12 with a large grain or single crystal microstructure is formed by casting and inner hub region 14 with a fine grain microstructure is formed by additive manufacturing and the two regions assembled during the additive manufacturing process.

In an example embodiment, the concept has been reduced to practice. Two coupons of Inconel 718 were fabricated by laser powder bed fusion with a fixed scan speed of 960 millimeters per second. One coupon was formed with a laser power of 285 watts and the second coupon was formed with a laser power of 180 watts. After fabrication, both coupons were subjected to the same post-processing treatments including a stress relief, a simulated hot isostatic press thermal (temperature and time) schedule without applying pressure, and a solution and aging treatment. Area weighted grain sizes were measured using electron backscattered diffraction in both the as-fused and post-processed states. The results are shown below in Table 1.

TABLE 1

| Condition | As Built Grain Size | Grain Size After Heat Treatment |
|---|---|---|
| High Energy Density | 37 microns | 54 microns |
| Low Energy Density | 30 microns | 44 microns |

The disclosure herein and the example measurement results in Table 1 show that by controlling the process parameters in a laser based additive manufacturing process, it is possible to manipulate the grain size of an additively built component to tailor the mechanical properties and achieve improvements in creep performance, fatigue resistance and other thermal mechanical properties of turbine alloys. It is possible to control the spatial variation of grain size to create a functionally graded structure, or a structure having distinct boundaries between grain sizes in separate regions, in additively manufactured turbine components.

Discussion of Possible Embodiments

The following are non-exclusive descriptions of possible embodiments of the present invention.

An additively manufactured alloy component may include: a first portion formed of an alloy and having a first grain size; and a second portion formed of the alloy and having a second grain size smaller than the first grain size.

The component of the preceding paragraph can optionally include, additionally and/or alternatively, any one or more of the following features, configurations and/or additional components:

The component may be an alloy turbine disk, the first portion may be a rim region of the disk and the second portion may be a hub region of the disk.

The rim region may be from about 10 percent to about 25 percent of the total area of the disk.

The hub region may be from about 50 percent to about 80 percent of the total area of the disk.

The alloy may be selected from a group consisting of nickel based alloys, cobalt based alloys, iron based alloys, mixtures of nickel based alloys, cobalt based alloys, and iron based alloys and titanium alloys.

The alloy may be Inconel 718.

The first grain size may be greater than 40 microns.

The second grain size may be between 10 nanometers and 30 microns.

A third portion of the component may be between the first portion and the second portion and may have a grain size that is grated from the first grain size to the second grain size.

The first portion may be formed by additive manufacturing and the second portion may be formed by deformation processing and the two portions may be joined during the additive manufacturing process.

The first portion may be formed by casting and the second portion may be formed by additive manufacturing and the two portions may be joined during the additive manufacturing process.

A method of additively manufacturing an alloy turbine disk having a first rim portion with a first grain size and a second hub portion with a second grain size smaller than the first grain size may include: forming a layer of alloy powder on a build platform; forming a first fused rim region of the layer of alloy power with a first grain size by scanning the first fused rim region with a laser at a first laser power and a first scan speed; forming a second fused hub region of the layer of alloy powder with the second grain size by scanning the second fused hub region with the laser at a second laser power and a second scan speed, wherein the second laser power is lower than the first laser power and/or the second scan speed is faster than the first scan speed; and repeating the process in a layer by layer fashion until the alloy turbine disk is formed.

The method of the preceding paragraph can optionally include, additionally and/or alternatively, any one or more of the following features, configurations, and/or additional components:

The method may include forming a fused transition region with a grain size gradient in the layer of alloy powder between the first fused region and the second fused region while changing the laser power from the first laser power to the second laser power and/or changing the scan speed from the first scan speed to the second scan speed.

The build platform may be a pre-formed rim region of the alloy turbine disk.

The build platform may be a pre-formed hub region of the alloy turbine disk.

The rim region may be formed with a grain size greater than 40 microns.

The hub region may be formed with a grain size between 10 nanometers and 30 microns.

The alloy powder may be selected from a group consisting of nickel based alloys, cobalt based alloys, iron based alloys, mixtures of nickel based alloys, cobalt based alloys and iron based alloys, and titanium alloys.

The rim region may be from about 10 percent to about 25 percent of the total area of the disk.

The hub region may be from about 50 percent to about 80 percent of the total area of the disk.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An additively manufactured alloy component comprising:
   a first portion formed of an alloy and having a first grain size;
   a second portion formed of the alloy and having a second grain size smaller than the first grain size; and
   a third portion between the first portion and the second portion with a grain size that is graded from the first grain size to the second grain size.

2. The additively manufactured alloy component of claim 1, wherein the alloy component is an alloy turbine disk, the first portion is a rim region of the alloy turbine disk, and the second portion is a hub region of the alloy turbine disk.

3. The additively manufactured alloy component of claim 2, wherein the rim region is from about 10 percent to about 25 percent of the total area of the disk.

4. The additively manufactured alloy component of claim 2, wherein the hub region is from about 50 percent to about 80 percent of the total area of the disk.

5. The additively manufactured alloy component of claim 1, wherein the alloy is selected from a group consisting of nickel based alloys, cobalt based alloys, iron based alloys, mixtures of nickel based alloys, cobalt based alloys and iron based alloys, and titanium alloys.

6. The additively manufactured alloy component of claim 5, wherein the alloy is Inconel 718.

7. The additively manufactured alloy component of claim 1, wherein the first grain size is greater than 40 microns.

8. The additively manufactured alloy component of claim 1, wherein the second grain size is between 10 nanometers and 30 microns.

9. The additively manufactured component of claim 1 wherein the first portion is formed by additive manufacturing and the second portion is formed by deformation processing and wherein the two portions are joined during additive manufacturing of the first portion.

10. The additively manufactured component of claim 1 wherein the first portion is formed by casting and the second portion is formed by additive manufacturing and wherein the two portions are joined during additive manufacturing of the second portion.

11. A method of additively manufacturing an alloy turbine disk having a first rim portion with a first grain size and a second hub portion with a second grain size smaller than the first grain size, the method comprising:
    forming a layer of alloy powder on a build platform;
    forming a first fused rim region of the layer of alloy powder with the first grain size by scanning the first fused rim region with a laser at a first laser power and a first scan speed;
    forming a second fused hub region of the layer of alloy powder with the second grain size by scanning the second fused hub region with the laser at a second laser power and a second scan speed, wherein the second laser power is lower than the first laser power and/or the second scan speed is faster than the first scan speed; and
    repeating the process in a layer by layer fashion until the alloy turbine disk is formed.

12. The method of claim 11 further comprising:
    forming a fused transition region with a grain size gradient in the layer of alloy powder between the first fused region and the second fused region while changing the laser power from the first laser power to the second laser power and/or changing the scan speed from the first scan speed to the second scan speed.

13. The method of claim 11, wherein the build platform is a pre-formed rim region of the alloy turbine disk.

14. The method of claim 11, wherein the build platform is a pre-formed hub region of the alloy turbine disk.

15. The method of claim 13, wherein the rim region is formed with a grain size greater than 40 microns.

16. The method of claim 14, wherein the hub region is formed with a grain size between 10 nanometers and 30 microns.

17. The method of claim 11, wherein the alloy powder is selected from a group consisting of nickel based alloys, cobalt based alloys, iron based alloys, mixtures of nickel based alloys, cobalt based alloys and iron based alloys, and titanium alloys.

18. The method of claim 13, wherein the rim region is from about 10 percent to about 25 percent of the total area of the disk.

19. The method of claim 14, wherein the hub region is from about 50 percent to about 80 percent of the total area of the disk.

20. An additively manufactured alloy component comprising:
   a first portion formed of an alloy and having a first grain size; and
   a second portion formed of the alloy and having a second grain size smaller than the first grain size;
   wherein the first portion is formed by additive manufacturing and the second portion is formed by deformation processing and wherein the two portions are joined during additive manufacturing of the first portion.

* * * * *